May 8, 1928.
A. J. SORBELLO
1,669,353
SMOKING PIPE
Filed Aug. 16, 1926
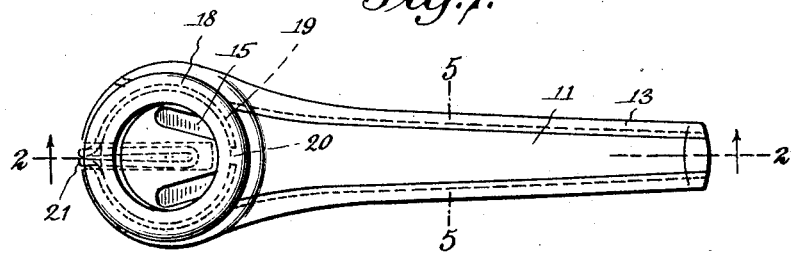
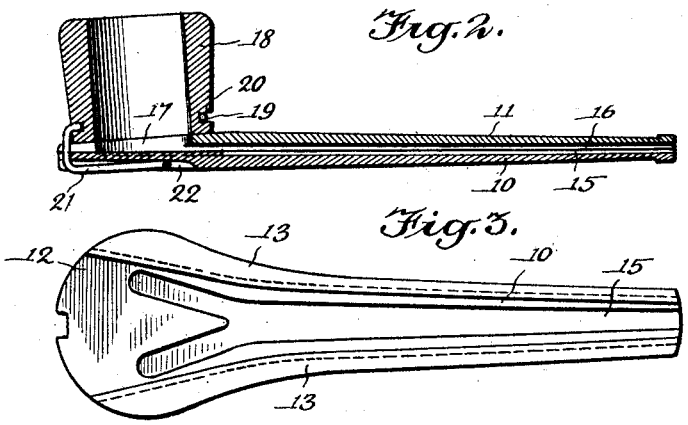
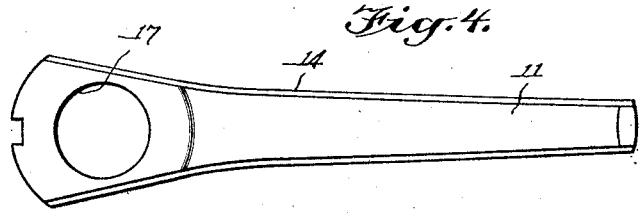
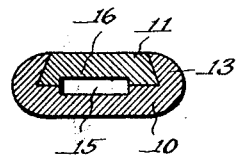
WITNESSES
INVENTOR
ANDREW J. SORBELLO
BY
ATTORNEYS Patented May 8, 1928.

1,669,353

UNITED STATES PATENT OFFICE.

ANDREW JOSEPH SORBELLO, OF BROOKLYN, NEW YORK.

SMOKING PIPE.

Application filed August 16, 1926. Serial No. 129,492.

The present invention is concerned with the provision of a smoking pipe which may be readily disassembled for purposes of cleaning and repair, or for purposes of transportation or storage.

It has been previously proposed to provide a smoking pipe in which the stem was formed of two flat sections laid one upon the other, and clamped together by suitable spring clamping means. I have found that this construction in which the stem was split from end to end is unsatisfactory for several reasons. In the first place no adequate means is provided for preventing warping of the stem sections when they are subjected to heat from the bowl of the pipe. Such warping would cause the edges of the sections to separate and permit the juice from the stem of the pipe to leak out through the sections, soiling the exterior of the pipe and spoiling the draft through the stem. In fact, even without heating it is difficult to keep the sections simply laid upon each other in absolute alignment, and to seal the split between the sections. Tobacco juice frequently leaks out of the stem.

In accordance with the present invention I have overcome all of these difficulties by the provision of a pipe in which the stem is formed of a channel section and a slide section, the latter being keyed into the channel section and rendering independent warping of the two sections impossible. The use of certain of the clamping means to prevent relative separation of the sections is eliminated, and the warping of the sections rendered unlikely and rendered unimportant even if it occurs.

Further objects of the invention are to provide a pipe of simple, practical construction, which will be rugged, durable and efficient in use, neat and attractive in appearance, and well suited to the requirements of economical manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a top plan view of a pipe embodying the present invention.

Fig. 2 is a longitudinal sectional view therethrough on the line 2—2 of Fig. 1.

Fig. 3 is a plan view of the flanged stem section.

Fig. 4 is a plan view of the sliding stem section.

Fig. 5 is an enlarged transverse sectional view on the line 5—5 of Fig. 1.

In the drawings I have used the reference characters 10 and 11 to designate the flanged stem section and the sliding stem section respectively of the pipe. Section 10 is relatively flat including a relatively wide rounded end 12 at the bowl end of the pipe which tapers to a relatively narrow end at the bit end of the pipe. Upstanding flanges 13 at the sides of the section 10 diverge gradually toward the bowl end thereof, these flanges being undercut for the reception of the bevelled edges 14 of the sliding section 11. Section 11 and section 10 are united by relative sliding movement which dovetails the bevelled edges 14 into the undercut flanges or rails 13. The sections may be formed with grooves 15 and 16 in their mating faces which cooperatively define a smoke passage.

The enlarged end of section 11 is formed with an opening 17 therein adapted to provide communication between the smoke passage and the open bottomed bowl 18 of the pipe.

It will be noted that the bowl 18 seats upon the flat upper face of the sliding section 11. Any suitable means may be provided for attaching the bowl to the stem. I have shown one convenient form of attaching means which includes a split spring ring 19 mounted in an annular groove 20 in the exterior of the bowl near the lower end of the latter. This ring is formed at its intermediate portion with an offset hook 21 adapted to be hooked over the ends of the pipe stem sections 10 and 11, and to engage a cam groove 22 cut in the lower face of section 10. Pipe bowl 18 is thus springheld firmly against the upper face of the section 11. There is no danger of leakage between the bowl and stem and any tendency of the stem to warp under the heat of the bowl will become unimportant due to the fact that the stem sections 11 and 10 are positively locked together against individual warping which would tend to cause a leak.

It is to be noted that the only spring clamping means necessary for coupling the stem sections, is the clamp which holds the bowl in place. The use of any clamping means near the bit end of the stem is eliminated and rendered unnecessary.

When disassembling the pipe for purposes of cleaning, the two sections of the stem are manually grasped and the bowl is pulled off over the end of the two sections. Opening 17 then offers a convenient finger hole for disconnecting the sections 10 and 11 by a relative sliding movement.

It is to be noted that the finger or clamp 21 serves a dual function. That is to say, it retains the bowl in position and it also prevents relative sliding movement of the stem sections in one direction. Such movement of the stem sections in the other direction is of course impossible due to the fact that section 11 flares at one end.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:—

1. In a smoking pipe, a stem including a relatively flat section including flanges at its sides extending from end to end thereof, a sliding section entered between the flanges by a sliding movement, said sections cooperatively defining a smoke passage, said sliding section having an opening therein near one end and an open bottomed bowl secured in position over said opening, said sliding section being of increasing width at one end to limit its sliding movement in one direction, and means securing the bowl to the stem and preventing relative sliding movement of the stem sections in the other direction.

2. A device as set forth in claim 1, wherein said means includes a split spring ring encircling the bowl and an offset spring hook portion embracing the stem sections and clamping the bowl to the stem.

ANDREW JOSEPH SORBELLO.